3,335,191
POLYHYDROXY ETHERS
Karl Brack, Wilmington, Del., assignor to Hercules Incorporated, a corporation of Delaware
No Drawing. Filed June 25, 1962, Ser. No. 205,114
6 Claims. (Cl. 260—613)

This invention relates to new polyols and more particularly to poly(dihydroxyalkyl) aryl ethers and their preparation by the reaction of polyhydric phenols with epoxy alcohols.

In accordance with this invention it has surprisingly been found that high molecular weight poly(dihydroxyalkyl) aryl ethers can be prepared by the reaction of polyhydric phenols with epoxy alcohols, the reaction taking place between the phenolic hydroxyl and the epoxy group of the epoxy alcohol. The reaction which takes place in accordance with this invention may be set forth as:

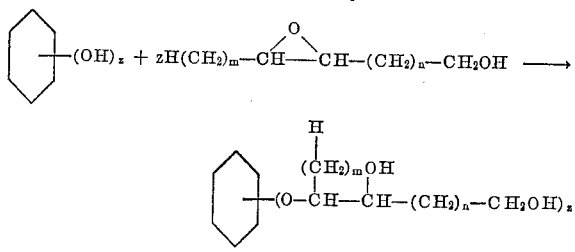

(1)

where $m$ and $n$ are whole numbers of from 0 to 10 and which can be alike or different and the sum of $m+n$ is 7 to 15 and $z$ is the number of hydroxyl radicals attached to the aryl nucleus, i.e. 2 or 3. Since either of the epoxy oxygen-to-carbon bonds can react, there can also be produced the isomeric polyether

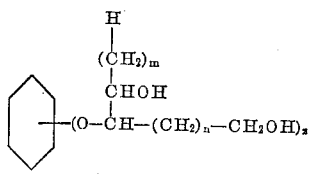

(2)

as well as the mixed polyethers having the formula

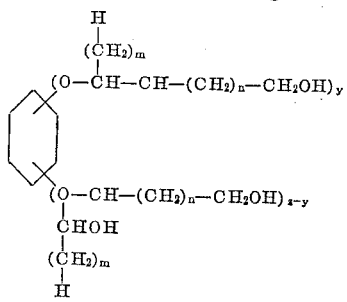

(3)

where $y$ is a whole number of at least one, but less than $z$.

Any polyhydric phenol can be reacted with the epoxy alcohols to produce the new polyhydroxy polyethers of this invention. The phenolic hydroxyls can be in the same or different benzene nuclei. Thus, the polyhydric phenol can be of the type

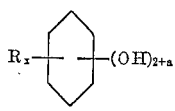

where R is alkyl, $x$ is 1 to 3 and $a$ is 0 or 1 as, for example, catechol, resorcinol, hydroquinone, 2,4-dihydroxytoluene, 3,5-dihydroxytoluene, pyrogallol, phloroglucinol, 1,2,4-trihydroxybenzene, etc., or the polyhydric phenol can be of the type

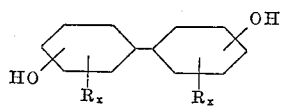

such as biphenol, 2,2'-dimethyl-biphenol, 3,3'-dimethyl-biphenol, etc., or the polyhydric phenol can be of the type

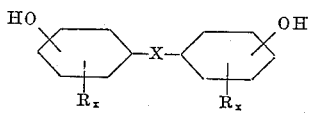

where X is an alkylene radical of 1 to 5 carbon atoms. Exemplary of the latter are bis(3,5-dimethyl-2-hydroxyphenyl) methane, bis(3-tert.-butyl-5-methyl-2-hydroxyphenyl) methane, 1,2-bis(3,5-dimethyl-2-hydroxyphenyl) ethane, 2,2-bis(p-hydroxyphenyl) propane, 2,2-bis(3-tert.-butyl - 5 - methyl-2-hydroxyphenyl) propane, 2,2-bis(2-methyl-4-hydroxy-5-tert.-butylphenyl) propane, etc.

Any aliphatic epoxy alcohol containing at least 10 carbon atoms may be used to prepare the new poly(hydroxyalkyl) aryl ethers of this invention. Thus, the epoxy alcohols will have the general formula

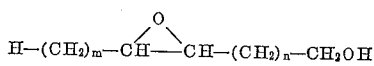

where $m$ and $n$ are whole numbers of from 0 to 10 and which can be alike or different and wherein the sum of $m+n$ is from 7 to 15. Exemplary of these epoxy are 9,10-epoxydecanol, 10,11-epoxyundecanol, 4,5-epoxytetradecanol, 8,9-epoxyhexadecanol, 9,10-epoxyoctadecanol, etc.

The reaction between the epoxy alcohol and the polyhydric phenol to produce the new polyhydroxy alkyl aryl ethers of this invention is readily carried out by heating a mixture of the two reagents to a temperature of from about 120° C. to about 240° C. and preferably from about 180° C. to about 240° C. An inert diluent may be used in carrying out the reaction, if desired, but is generally not necessary. Suitable diluents that may be used are toluene, xylene, dimethylformamide, dioxane, dimethylsulfoxide, etc.

The reaction is preferably carried out in the presence of a base catalyst such as sodium methoxide, alkali salts of the polyhydric phenol being reacted, triethylene diamine, trimethyl benzyl ammonium hydroxide, etc. Salts of heavy metals may also be used to catalyze the reaction as, for example, cobalt acetate, mercuric acetate, etc.

In carrying out the reaction it is generally preferable to use an excess of the epoxy alcohol, usually an excess of from 10 to 30%. After the reaction the epoxy alcohol is easily removed by distillation, countercurrent extraction with suitable solvents, etc.

The new poly(dihydroxyalkyl) aryl ethers of this invention are useful in the preparation of foams, films, resins, plastics, and elastomers of various degrees of hardness, flexibility, toughness, etc. They can be cross-linked with di- or polyisocyanates, carboxylic acid anhydrides, dicarboxylic acids, bis-epoxides, melamine-formaldehyde resins, urea-formaldehyde resins, etc.

The following examples illustrate the preparation of these new poly(dihydroxyalkyl) aryl ethers are the use of these polyols in the preparation of films, coatings, etc., and of prepolymers that may in turn be used in these applications. All parts and percentages are by weight unless otherwise indicated.

Example 1

A mixture of 57 parts of 2,2-bis(p-hydroxyphenyl) propane, 230 parts of 9,10-epoxyoctadecanol, and 0.75 part of sodium methoxide was heated to 230° C. for one hour with stirring. With the temperature held at 230° C., the pressure was reduced, by applying vacuum, down to 0.2 mm. of mercury. During this time 45.7 parts of unreacted 9,10-epoxyoctadecanol was collected as a distillate. The reaction mixture was then dissolved in 480 parts of methyl isobutyl ketone, and the solution was washed with 100 parts of an aqueous 25% sodium hydroxide solution and then twice with 100 parts of a saturated solution of sodium chloride. After drying the solution over sodium sulfate, the solvent was removed by distillation under reduced pressure whereby there was obtained a clear, oily product amounting to 240.7 parts. It was then further purified by steam distillation under vacuum of 0.25 mm. mercury at 200° C. The product so obtained was a clear, off-white viscous oil and amounted to 193.6 parts which corresponds to a yield of 97.4% based on the starting polyphenol. Analysis of the product showed that it contained 76.05% carbon, 11.25% hydrogen, and 8.61% of active hydrogen (measured as hydroxyl). The theoretical value for the 2,2-bis(p-dihydroxyoctadecyloxyphenyl) propane which has the general formula $C_{51}H_{88}O_6$ is 76.8% carbon, 11.15% hydrogen and 8.5% active hydrogen (measured as hydroxyl).

Example 2

A mixture of 22 parts of hydroquinone, 200 parts of 9,10-epoxyoctadecanol and 0.50 part of sodium methoxide was heated to 230° C. for 2 hours with stirring. After cooling to room temperature, the crude reaction product was dissolved in 370 parts of methanol. To remove the sodium ion used as a catalyst, there was then added 100 parts of a sulfonic acid ion exchange resin, and the mixture was stirred for 1 hour, after which the ion exchange resin was removed by filtration. The filtrate was then extracted four times with 330 parts of hexane for each extraction. From the hexane extracts there was recovered 45.4 parts of unreacted 9,10-epoxyoctadecanol. Water was then added to the methanol solution until the product had separated as a heavy oil. The heavy oil layer was separated and dried under vacuum whereby there was obtained 134.9 parts of a viscous oil. By distillation to remove the methanol and water from the remainder there was obtained another 23.2 parts of the viscous oil product. On analysis the product was found to contain 73.85% carbon, 11.8% hydrogen, 14.9% oxygen and 9.2% active hydrogen (measured as hydroxyl). The theoretical values for 1,4-bis(dihydroxyoctadecyloxy) benzene, i.e. $C_{42}H_{78}O_6$ are 74.2% carbon, 11.5% hydrogen, 14.2% oxygen and 10.0% active hydrogen (measured as hydroxyl).

Example 3

A mixture of 11 parts of hydroquinone, 50 parts of 10,11-epoxyundecanol and 0.250 part of sodium methoxide was heated to 180° C. for 2 hours with stirring. After cooling to room temperature, the crude product was washed three times with 100-part portions of 50% aqueous methanol in order to remove the unreacted 10,11-epoxyundecanol. The residue was then dissolved in 790 parts of hot methanol. The solution was allowed to cool to room temperature whereupon the product precipitated. Separation of the product by filtration yielded 30.1 parts of a soft, white solid. On analysis this product was found to contain 13.4% active hydrogen (measured as hydroxyl). The theoretical value for 1,4-bis(2,11-dihydroxyundecyloxy) benzene, i.e. $C_{28}H_{50}O_6$ is 14.1% active hydrogen (measured as hydroxyl).

Example 4

A mixture of 22.8 parts of 2,2-bis(p-hydroxyphenyl) propane, 50 parts of 10,11-epoxyundecanol and 0.250 part of sodium methoxide was heated to 180° C. with stirring for two hours. After cooling to room temperature, the crude reaction product was washed five times with 100-part portions of 50% aqueous methanol to remove the unreacted 10,11-epoxyundecanol. The residue was then dried under vacuum. There was obtained as the product 52.7 parts of a clear, off-white oil. On analysis it was found to contain 10.9% active hydrogen measured as hydroxyl. The calculated value for 2,2-bis[p-(2,11-dihydroxyundecyloxy)phenyl] propane, i.e. $C_{37}H_{60}O_6$, is 11.3% active hydrogen measured as hydroxyl.

The following examples illustrate various processes by which the new polyhydroxy polyethers of this invention can be cross-linked to produce useful resins for the production of coatings, films, foams, etc.

Example 5

Five parts of the tetrol produced as described in Example 1 was dissolved in 8.9 parts of tetrahydrofuran. To this solution with good stirring was then added 2.2 parts of toluene diisocyanate, and the solution so obtained was cast on to three glass plates. The solvent was allowed to evaporate, and the three plates were then separately heated, one at room temperature for 16 hours, one at 75° C. for 2 hours and one at 150° C. for 15 minutes. Under these conditions all three films were clear and hard and could not be scratched by the fingernail. All three films were insoluble in methyl isobutyl ketone and tetrahydrofuran.

Example 6

One part of the tetrol produced in Example 4 was dissolved in 8.0 parts of tetrahydrofuran. Then with stirring there was added 0.575 part of toluene diisocyanate dissolved in 4.6 parts of tetrahydrofuran. The solution so obtained was poured on to a glass plate and the solvent was allowed to evaporate. The film was cured for two hours at 120° C. There was obtained a hard, clear film which could not be scratched with the fingernail. The film was insoluble in methyl isobutyl ketone, cyclohexanone and tetrahydrofuran.

Example 7

One part of the tetrol produced in Example 3 was dissolved in 20 parts of hot methyl isobutyl ketone; and, while stirring, 0.720 part of toluene diisocyanate was added as a 10% solution in tetrahydrofuran. A film was cast from the solution and cured at 120° C. for two hours. The film so obtained was clear, could not be scratched with the fingernail, and was insoluble in methyl isobutyl ketone, cyclohexanone, and tetrahydrofuran.

Example 8

Ten parts of a 10% solution in tetrahydrofuran of the tetrol produced as described in Example 1 was mixed with 0.600 part of a solution of butylated melamine-formaldehyde resin (50% solids in butanol and toluene). A film was then cast and cured at 160° C. for 7 hours. The film so obtained was insoluble in methyl isobutyl ketone and tetrahydrofuran.

Example 9

Ten parts of a 10% solution in tetrahydrofuran of the tetrol produced as in Example 1 was mixed with 0.450 part of phthalic anhydride. A film was cast and cured for 7 hours at 160° C. This film so obtained was insoluble in methyl isobutyl ketone and tetrahydrofuran.

Example 10

Ten parts of a 10% solution in tetrahydrofuran of the tetrol produced in accordance with Example 1 was mixed with 0.077 part urea and 0.423 part of a 37% aqueous formaldehyde solution. On casting a film from this mixture and baking at 160° C. for 4 hours, there was obtained a somewhat sticky film which was insoluble in methyl isobutyl ketone and tetrahydrofuran.

Example 11

To 50 parts of the tetrol produced in accordance with Example 4 was added 0.158 part of a silicone oil as a surfactant and then with stirring 39.6 parts of toluene diisocyanate was added in one portion. The stirring was continued for one minute, then 1.15 parts of water containing 0.200 part of triethylenediamine was added in one portion. After stirring for 0.5 min., the reaction mixture was allowed to foam. The foam was cured at room temperature overnight. A white, hard foam was obtained, which had a density of 4.1 lbs./cu. ft. and was unaffected by solvents such as methyl isobutyl ketone and tetrahydrofuran.

The preparation of prepolymers from the tetrols produced in accordance with the above examples is shown below.

Example 12

Twenty-three parts of the tetrol produced in accordance with Example 1 was mixed with 5.0 parts of dimethyl adipate and 0.230 part of a lead monoxide. This mixture was then heated under nitrogen for 5 hours at 180° C., during which time 1.6 parts of methanol (a by-product from the transesterification) was collected. The product so obtained had an ester number of 117.2 and 4.91% active hydrogen (calculated as hydroxyl).

A portion of this product (2.3 parts) was dissolved in 22 parts of tetrahydrofuran and 0.450 part of toluene diisocyanate, added as a 10% solution in tetrahydrofuran with stirring. A film was cast from this solution and baked at 85° C. for 6 hours. The film so obtained was clear and hard and was insoluble in methyl isobutyl ketone and tetrahydrofuran.

Example 13

A mixture of 8.4 parts of isophthalic acid, 39.8 parts of the tetrol produced as described in Example 1 and 0.200 part of sodium methoxide was heated to 200° C. for 5 hours. This product had an acid number of 37.5, an ester number of 87.2 and contained 6.61% active hydrogen (calculated as hydroxyl).

On cross-linking the above-prepared prepolymer with toluene diisocyanate there was obtained a slightly cloudy medium-hard film which was insoluble in methyl isobutyl ketone and tetrahydrofuran.

Example 14

A mixture of 41.0 parts of the tetrol produced as described in Example 1, 10.0 parts of dimethyl terephthalate, and 0.30 part of lead monoxide was heated for 2 hours at 220° C. During this time there was obtained 2.4 parts of methanol (by-product of the transesterification). The prepolymer product so obtained was a tough, rubbery resin which was soluble in tetrahydrofuran and methyl isobutyl ketone. It had an acid number of 3.2, an ester number of 120.5, and contained 5.06% active hydrogen (calculated as hydroxyl).

On cross-linking this preporlymer with toluene diisocyanate a clear, hard film was obtained which was insoluble in methyl isobutyl ketone and tetrahydrofuran.

Example 15

A prepolymer was prepared by heating to reflux with vigorous stirring a mixture of 9.0 parts of the tetrol produced as described in Example 1, 55.1 parts of dimethyl sulfoxide and 40 parts of methyl isobutyl ketone, and then adding 2.4 parts of toluene diisocyanate dissolved in 40 parts of methyl isobutyl ketone during ½ hour. The reaction mixture was stirred for an additional 1½ hours under reflux. On removal of the solvent there was obtained a sticky gum, which prepolymer was soluble in cold tetrahydrofuran and methyl isobutyl ketone. An infrared spectrum indicated 4.8% active hydrogen present and no isocyanate was detected.

What I claim and desire to protect by Letters Patent is:

1. A poly(dihydroxyalkyl) aryl ether having the formula:

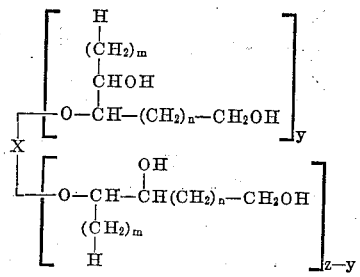

where X is an organic residue containing at least one benzene nucleus to which the ether oxygen is linked, $m$ and $n$ are whole numbers of from 0 to 10 and the sum of $m+n$ is from 7 to 15, $z$ is a whole number from 2 to 3, and when $z$ is 2, $y$ is a whole number from 0 to 2, and when $z$ is 3, $y$ is a whole number from 0 to 3, said organic residue being selected from the group consisting of benzene nuclei, biphenyl nuclei, and diphenylalkylene nuclei wherein the alkylene group contains 1 to 5 carbon atoms.

2. A poly(dihydroxyalkyl) aryl ether having the formula

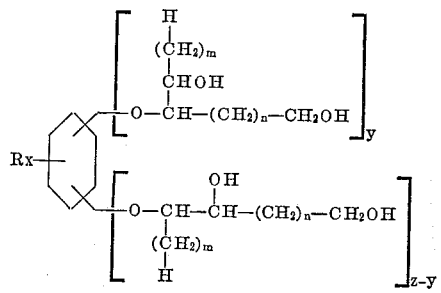

where R is methyl, $x$ is a whole number of from 0 to 3, $m$ and $n$ are whole numbers of from 0 to 10 and the sum of $m+n$ is from 7 to 15, $z$ is a whole number from 2 to 3, and when $z$ is 2, $y$ is a whole number from 0 to 2, and when $z$ is 3, $y$ is a whole number from 0 to 3.

3. 2,2-bis[p-(2,11-dihydroxyundecyloxy)phenyl] propane.

4. 1,4-bis(2,11-dihydroxyundecyloxy) benzene.

5. A poly(dihydroxyalkyl) aryl ether having the formula

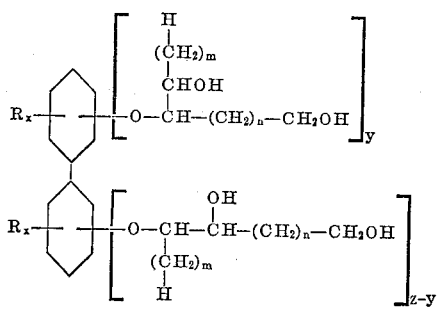

where R is methyl, $x$ is a whole number of from 0 to 3, $m$, and $n$ are whole numbers of from 0 to 10 and the sum of $m+n$ is from 7 to 15, $z$ is a whole number from 2 to 3, and when $z$ is 2, $y$ is a whole number from 0 to 2, and when $z$ is 3, $y$ is a whole number from 0 to 3 and $x$ is a whole number of from 0 to 2.

6. A poly(dihydroxyalkyl) aryl ether having the formula

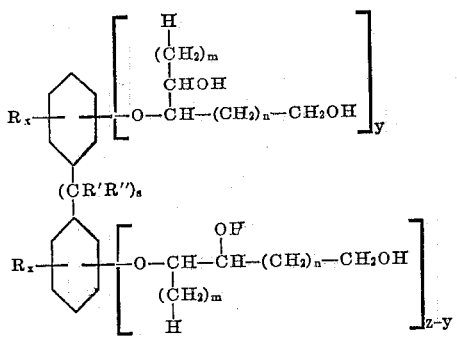

where R is an alkyl radical of 1 to 4 carbon atoms, $x$ is a whole number of from 0 to 3, R' and R" are each selected from the group consisting of hydrogen and methyl, $s$ is a whole number of from 1 to 2, $m$ and $n$ are whole numbers of from 0 to 10 and the sum of $m+n$ is from 7 to 15, $z$ is a whole number from 2 to 3, and when $z$ is 2, $y$ is a whole number from 0 to 2, and when $z$ is 3, $y$ is a whole number from 0 to 3 and $x$ is a whole number of from 0 to 2.

References Cited

UNITED STATES PATENTS

| | | | |
|---|---|---|---|
| 2,331,265 | 10/1943 | Coleman et al. | 260—613 |
| 2,491,533 | 12/1949 | Swern | 260—613 XR |
| 2,902,518 | 9/1959 | Hurdis et al. | 260—613 |
| 3,065,276 | 11/1962 | Guest et al. | 260—613 |
| 3,162,615 | 12/1964 | Bremmer | 260—613 XR |

LEON ZITVER, *Primary Examiner.*

B. HELFIN, *Assistant Examiner.*